United States Patent Office 2,746,027
Patented May 15, 1956

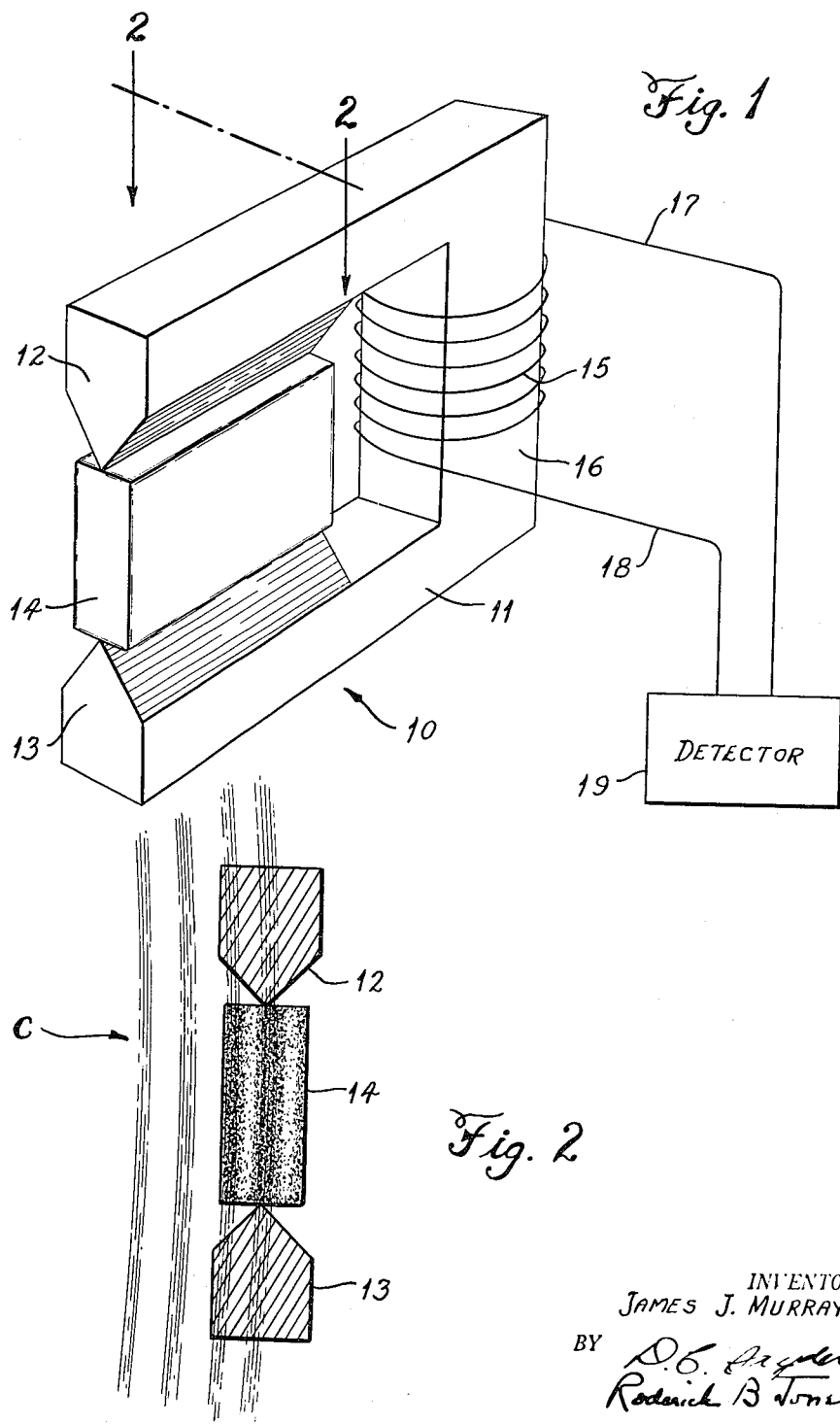

2,746,027

FLUX-GAP VARIATION TRANSDUCER FOR HYDROPHONES, MICROPHONES, AND ACCELEROMETERS

James J. Murray, Easthampton, Mass.

Application November 16, 1951, Serial No. 256,808

6 Claims. (Cl. 340—11)

(Granted under Title 35, U. S. Code (1952), sec. 266)

The invention described herein may be manufactured and used by or for the Government of the United States of America for governmental purposes without the payment of any royalties thereon or therefor.

This invention relates to hydrophone or microphone or accelerometer transducers when used in air, gases or solids, and is directed particularly to a motional detecting device of the type wherein detection depends upon variation of the magnetic flux across a gap in a magnetic circuit in accordance with energy imparted by a compressional wave or an acceleration sufferance.

Flux-gap variation hydrophones of the type having a solid or laminated metallic armature or diaphragm across, but slightly spaced from, poles of a magnet are known. In such instruments variation of the armature or diaphragm in accordance with underwater sound waves, i. e., a train of compression wave energy, results in a corresponding variation in the intensity of the flux across the gap, and, simultaneously, in the magnetic circuit. A pick-up coil wound around one or more of the branches of the magnetic circuit has induced in it, by virtue of the varying intensity of the flux in the magnet, a corresponding electro-motive force, which energizes a suitable detector for identification of the wave energy received.

Known hydrophones of the character described are extremely inefficient because of the inherent high inertia of the metallic armature or diaphragms employed. Moreover, such metallic armatures and diaphragms exhibit a very high mechanical "Q," resulting in a sharply accentuated frequency response curve at resonance. This precludes even an approximate flat frequency response in the prior art devices because resonance in these devices generally occurs within or close to the limits of the operating frequency range.

Flux-gap variation accelerometers of the type having a solid or laminated armature or diaphragm across, but slightly spaced from poles of a magnet are known. In such instruments variation of the armature or diaphragm in accordance with accelerated motion by the accelerometer results in a corresponding variation in the intensity of the flux across the gap, and, simultaneously in the magnetic circuit. A pick-up coil wound around one or more of the branches of the magnetic circuit has induced in it, by virtue of the varying intensity of the flux in the magnet, a corresponding electromotive force, which energizes a suitable detector for identification of the acceleration involved. Besides flux-gap variation accelerometers, strain gage diaphragm type acceleratometers are also well known in the art of acceleration detection.

Accelerometers of the character described are extremely inefficient because of the inherent high inertia of the metallic armatures or diaphragms employed. Moreover such metallic armatures and diaphragms exhibit a very high mechanical "Q" resulting in a sharply accentuated frequency response curve at resonance. This is also referred to as a critical resonant condition. This critical resonant condition usually occurs or exists in the frequency range of operation that is of the greatest interest, namely, 0 to 3000 cycles per second, due to the significant mass of the responding element, the armature, diaphragm, or strain gage assembly.

This invention makes use of colloidal particles in the flux gap of a flux-gap variation transducer. Due to the low mass of the individual colloidal particles, this invention does not suffer from inefficiency due to inherent high inertia; furthermore it provides a substantially flat frequency response because its resonant frequency condition exists at a frequency much higher than the frequency range of interest. For particular purposes, the colloidal particle size may be made large enough to show a resonance peak within or close to the limits of the operating frequency range of the transducer.

An object of this invention is to provide an improved flux-gap variation transducer for hydrophones, microphones and accelerometers.

A further object of this invention is to provide an improved flux-gap variation transducer for hydrophones, microphones or accelerometers, wherein the flux-varying element possesses a very low mechanical inertia, resulting in high sensitivity.

It is another object to provide a flux gap variation transducer the characteristics of which can readily be controlled during manufacture to provide the frequency response desired in the assembled transducer.

It is a further object to provide a transducer for hydrophone, microphone or accelerometer having a readily replaceable flux-varying element.

Further objects are to provide a device of the character described, which will be easy to install and manipulate, insensitive to temperature variations, simple in construction, and extremely durable.

Other objects and many of the attendant advantages of this invention will be readily appreciated as the same becomes better understood by reference to the following detailed description when considered in connection with the accompanying drawings wherein:

Fig. 1 is a perspective view of the improved transducer, illustrating how it may be interconnected with an electric detector for the detection of compressional wave energy, and Fig. 2 is a vertical cross-sectional view, taken along the line 2—2 of Fig. 1, illustrating how the progression of compressional waves through the active element, in passing through the magnetic gap, varies the permeability of the material between the poles of the gap.

Though Fig. 2 of the drawing illustrates the preferred embodiment of this invention used in detecting compressional wave energy, an analogous situation exists where this invention is used for detecting acceleration. Instead of a compressional wave coming from without the transducer, essentially one or more compressional waves are set up within the transducer due to an acceleration sufferance.

In the drawing, in which like reference numerals denote corresponding parts, the numeral 10 designates generally the improved transducer contemplated by the invention, the same comprising a horse-shoe or U-shaped permanent magnet 11, having opposed poles 12 and 13 defining a gap, within which and between the poles of which is fixed a flux-varying element 14. The poles 12 and 13 are preferably ground to wedge shape, as illustrated, to produce a highly concentrated flux field directly between the apexes of the wedges.

The U-shaped magnet 11 is provided with a pick-up coil 15, wound around the connecting leg 16 thereof, said coil being adapted to have induced in it an electromotive force varying in accordance with changing flux intensity within the magnet. The pick-up coil 15 is connected, as by the wires 17 and 18, to a suitable electrical detector 19 for detection or identification of the signal received.

The flux-varying element 14 is comprised of a paramagnetic colloid suspended or dispersed in a solvent, which may be termed the active vehicle, such as a gel, rubber, resin, plastic, or any other organic or inorganic substantially non-magnetic material. The solvent serves as an active vehicle within which the paramagnetic particles can move in accordance with the energy imparted by a compressional wave or an acceleration sufferance; and it can be either in the form of a liquid or a solid. However, it is to be understood that if a liquid colloid suspension is employed, a relatively hard container or enclosing capsule will be necessary to support the solvent in position between the poles of the magnetic gap.

Finely divided nickel has been found to be especially suitable as the paramagnetic colloid. Dyprosium oxide ($DySO_3$), holmium oxide ($Ho_2O_3$), and ferric hydroxide ($Fe(OH)_3$), as well as other materials having high paramagnetic qualities and either existing in the form of, or capable of being readily reduced to, minute particles for suspension could alternatively be used.

In the embodiment illustrated (see Fig. 2), rubber is used as the active vehicle or solvent, the suspended particles being finely divided nickel kneaded therein. Rubber is especially suitable for the active vehicle in the transducer when the transducer is for a hydrophone since rubber has substantially the same specific acoustic impedance as water, whereby passage of a compressional wave therethrough will occur without appreciable reflection, refraction, or phase change of the wave. Such efficient energy transfer from the compressional wave medium, i. e. the water, to the minute particles in suspension, results in extraordinary efficiency in the improved transducer herein disclosed, In Fig. 2, the letter C represents one of a series of compressional wave fronts propagated through a medium such as water and acting on the flux-varying element 14. It will be noted that changes in colloidal density of the flux-varying element 14 occur within the magnetic gap between the poles 12 and 13. These variations in colloidal density, the colloid being of paramagnetic nature, give rise to corresponding changes in susceptibility in the volume between the magnetic poles, which, in turn, causes a variation in flux in the magnetic circuit. Changes in flux in the magnetic circuit induce a corresponding electromotive force in the pick-up coil 15 enclosing the leg 16 thereof. The operation of an accelerometer in accordance with this invention is analogous to the above. An acceleration sufferance by the transducer produces a similar result.

The active vehicle or solvent comprising the flux-varying element 14 permits the suspensoid or colloid equal movement in any direction in the solvent, as it is equally acted upon by the molecular restoring forces of the solvent molecules in every direction. This condition permits the suspensoid to vibrate with the existing stimuli, i. e. the compressional wave fronts, in any incoming plane, or acceleration sufferances in any direction modified only by the suspensoid's size and the modulus of elasticity of the solvent. In the case of ordinary flux variation hydrophones or accelerometers employing metallic armatures or diaphragms, on the contrary, the induced oscillations are restricted within a plane determined by the supports to which they are fixed.

Because of the minute size of the particles comprising the colloid or suspensoid, and because of the elasticity of the solvent, the flux-varying element 14 has a low mechanical "Q," resulting in a comparatively flat frequency-response curve. Moreover, since it is possible easily to control the "Q," in such a manner as by varying the size of the colloidal particles, a plurality of individual elements 14 having particular frequency-response characteristics desired can be selectively employed, whereby the improved hydrophone is readily adaptable for reception of all kinds of underwater signals and the improved accelerometer is readily adaptable for all kinds of acceleration sufferances at a minimum of expense and trouble.

Although the suspensoid particles are described herein as being paramagnetic, whereby there is an increase in flux density upon compression of the active element 14 within the gap, they might also be of diamagnetic material, in which case there would be a decrease in flux density upon compression. The net result desired of flux variation in accordance with compressional wave energy received or acceleration sufferance would, of course, be the same.

Although the present invention has been generally described as being an underwater sound receiver or an accelerometer, it could also function as a compressional wave projector, the coil 15 being used as an energizing or exciting coil instead of a pick-up coil, as will be apparent to those skilled in the art.

The present invention can be used in mediums other than water such as gases, solids or various liquids where sound can be propagated.

Obviously many modifications and variations of the present invention are possible in the light of the above teachings. It is therefore to be understood that within the scope of the appended claims the invention can be practiced otherwise than as specifically described.

I claim:

1. In a hydrophone, the combination comprising a magnetic circuit including a magnet having a pair of spaced magnetic poles of opposite polarity defining a flux gap therebetween, a body in said flux gap, said body comprising a magnetic colloid dispersed in a non-magnetic solvent, said body being adapted to be activated by a compressional wave to vary the colloidal concentration and hence vary the flux in said gap, and electric means coupled to said magnet of said magnetic circuit remote from said gap and responsive to flux changes within said gap for detecting the activation of said body.

2. The invention as defined in claim 1 wherein said colloid is paramagnetic.

3. The invention as defined in claim 1 where said colloid is diamagnetic.

4. In an electro-mechanical transducer, the combination comprising a magnetic circuit including a magnet, a gap in said magnetic circuit defining a pair of opposed magnetic poles, a pressure responsive flux-varying element in said gap and comprising a suspension of finely divided magnetic particles dispersed in a suspending medium, and electric means coupled to said magnet of said magnetic circuit remote from said gap and responsive to flux changes therein to detect pressure changes in said flux-varying element.

5. The invention as defined in claim 4 wherein said flux-varying element comprises finely divided nickel suspended in rubber.

6. An electro-magnetic transducer comprising a magnetic circuit including a magnet, a gap in said magnetic circuit defining a pair of opposed poles, and an active element within said gap and operative to vary in the magnitude of its internal stresses corresponsive with flux changes within said magnetic circuit, said active element comprising a colloidal suspension of magnetic particles in a non-magnetic suspensoid, and electric means coupled to said magnet of said magnetic circuit remote from said gap operative to carry a varying current corresponsive with flux changes within said circuit.

References Cited in the file of this patent

UNITED STATES PATENTS

| | | |
|---|---|---|
| 2,249,835 | Lakatos | July 22, 1941 |
| 2,391,678 | Bundy | Dec. 25, 1945 |
| 2,532,876 | Asche | Dec. 5, 1950 |

FOREIGN PATENTS

| | | |
|---|---|---|
| 413,762 | Great Britain | July 26, 1934 |